Patented Feb. 25, 1941

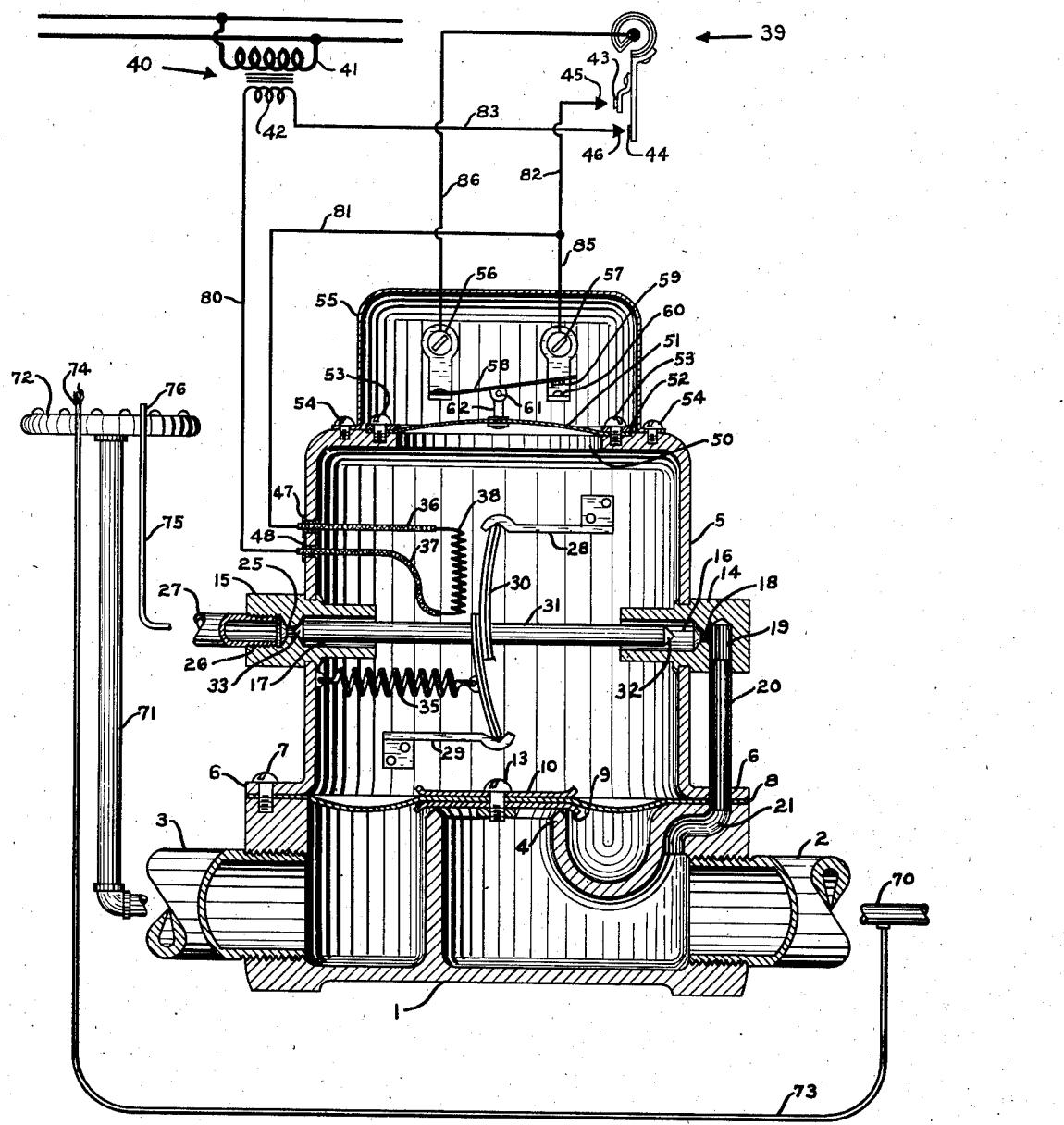

2,232,934

UNITED STATES PATENT OFFICE 2,232,934

CONTROL VALVE

Albert E. Baak, Minneapolis, Minn., assignor to Minneapolis-Honeywell Regulator Company, Minneapolis, Minn., a corporation of Delaware Application June 18, 1938, Serial No. 214,485

7 Claims. (Cl. 236—84)

My invention is in the art of temperature controlled valves and is directed more particularly to a novel thermostatic control for a gas valve or the like, the gas valve having unique constructional features providing for cooperation with the thermostatic control whereby the desired control effect is produced in a new and efficient manner.

The structure of my invention may embody a pilot valve controlled diaphragm gas valve, the pilot valve or valves being actuated in response to a thermostat. I use an electric thermostat or other controller of the double contact type, the advantages of this species of thermostat being well known in the art and not requiring detailed explanation. With this type of thermostat, an energizing circuit for the device being controlled is completed when both thermostatic contacts are made, and completion of the said circuit causes closure of auxiliary holding circuit contacts whereby the device remains energized until both thermostatic contacts are broken. The primary object of my invention is the provision of a novel and efficient constructional and wiring arrangement for producing the holding circuit as described.

Another object of my invention is the provision in a pilot valve controlled device of pressure actuated contact making means responsive to pressure controlled by the pilot valve or valves.

Another object is the provision in a diaphragm type valve of an auxiliary diaphragm for actuating electrical contacts.

A further object is the provision of a diaphragm type valve in combination with a thermostatic control of the type utilizing a holding circuit, the valve having an auxiliary diaphragm responsive to pressures in the diaphragm chamber for actuating the holding circuit contacts.

The single figure of the drawing is a cross sectional view of my improved thermostatic valve construction diagrammatically illustrating the manner of its incorporation in a gas fired heating system.

Referring to the drawing, numeral 1 represents the body of my valve and numerals 2 and 3 indicate conduits connected to the inlet and outlet of the valve, respectively. The internal configuration of the valve is as shown in the cross sectional view, forming a seat at 4. Numeral 5 represents a cap or cover which has a flange 6 secured to the upper surface of the body of the valve by screws 7. Interposed between the body of the valve and the flange 6 are the peripherial portions of a diaphragm 8, my valve being of the diaphragm type. The diaphragm 8 carries a valve seat disc 9 made of any suitable valve material at the lower side of the central portion, and arranged opposite to the seat disc on the other side of the diaphragm is a disc backing member 10, the discs and diaphragm being secured together by a bolt 13.

The cap or cover 5 houses the pilot valve mechanism by which my improved valve is controlled. Located in opposite side walls of the cover of the cap member 5 and diametrically opposed to each other are plug members 14 and 15 providing for communication to and from the interior of cap 5, respectively. The plugs 14 and 15 have openings 16 and 17, respectively, the outward tapered ends of which form valve seats as shown. A port 18 in the plug 14 provides communication between the opening 16 and another vertically tapped opening 19 in the plug. Connecting with the tapped opening 19 in plug 14 is a tube 20 which extends through an opening in the flange 6 and the diaphragm 8 to a channel 21 formed in the body 1 of the valve. The channel 21 is curved as shown so as to communicate with the inlet side of the valve.

Communicating with the outer end of the opening 17 in plug 15 is a port 25 which connects with a screw-threaded tapped hole 26 into which is screwed the end of a bleed pipe 27.

Mounted within the interior of the cover 5 is a pair of resilient supports 28 and 29 for a bimetal thermal element 30. The bimetal element 30 comprises two strips of bimetal soldered or otherwise secured together at their ends and carrying a valve member 31 which extends through the joined portions of the two bimetal strips. The bimetal element 30 is normally held in a bowed position between its supports 28 and 29 and may snap between bowed positions on opposite sides of a dead-center position. The valve member 31 may take the form of a metal rod having its ends machined to a conical form so as to form a valve at each end of the rod, as indicated at 32 and 33. When the bimetal element 30 is flexed or bowed to the left as shown on the drawing, the valve 33 at the left end of valve member 31 is seated on the valve seat in plug 15, and when the bimetal element 30 is bowed to the right the valve 32 is seated on the valve seat in the plug 14. A coil spring 35 is connected between the bimetal element 30 and the wall of the cover member 5 at a point adjacent the plug 15 and continuously biases the valve member 31 in closing direction of valve 33.

Located adjacent the bimetal strip forming the upper portion of element 30 is an electrical heating resistance 38 which is controlled by a thermostat generally indicated at 39, and which receives its energy from a step-down transformer indicated at 40. The heating resistance 38 has insulated electrical connections 36 and 37 extending through adaptor members 47 and 48 in the side wall of cover 5. Upon energization of the heating element 38, the bimetal element 30 warps in a manner as to bow in the opposite direction to that shown in the drawing causing the element to snap past its dead-center position and bow to the right against the force of spring 35, unseating valve 33 and seating the valve 32.

The transformer 40 may be of conventional type having a primary winding 41 and a secondary winding 42. The thermostat 39 may also be of a conventional bimetallic element type having two contact members 43 and 44 which make contact with associated fixed contact members 45 and 46 at slightly different temperatures. In other words, the contact member 44 engages the contact 46 one or two degrees before the contact member 43 engages the contact 45. This sequence obtains when the temperature is falling, and upon a rise in temperature the sequence of opening of the contacts is the opposite, that is, contacts 43 and 45 break before contacts 44 and 46 break. The electrical wiring in the various circuits which I employ will be fully described in a discussion of the operation of my improved control device which follows.

It will be seen that in the upper horizontal portion of the cover 5 of the valve is a circular opening 50 which is covered and sealed by an auxiliary flexible diaphram 51. A metal ring 52 engages the peripheral portions of the diaphragm 51 and secures them to the upper surface of the cover 5 by means of screws 53. Secured also to the upper surface of the cover 5 by means of screws 54 is a housing 55. Within the housing 55 is a pair of electrical terminals 56 and 57, the terminal 56 supporting a flexible metal blade 58 which may be secured thereto by riveting or any suitable means. The opposite end of the blade 58 carries a contact member 59 which may engage a fixed contact 60 which is connected to and forms part of the electrical terminal 57. The central portion of the blade 58 is pivoted as seen at 61 to an operating stem 62 which is secured to the central portion of the diaphragm 51. Whenever there is pressure within the cover 5, the diaphragm 51 is flexed upwardly as shown in the drawing and the contacts 59 and 60 are separated. Whenever the pressure is released from within cover 5, the diaphragm 51 flexes downwardly carrying the resilient blade 58 therewith causing the contacts 59 and 60 to engage with each other.

As previously pointed out, my improved thermostatic control device may be advantageously employed in a gas fired heating system, the thermostat 39 being located in spaces being heated. I have shown my invention as applied to such a system in diagrammatic form. Referring to the drawing, numeral 70 indicates a gas supply main which may connect to the inlet 2 of my improved valve. Numeral 71 indicates a gas supply conduit which may connect to the outlet 3 of the valve and supplies gas to a burner 72 of conventional type. A small conduit 73 connects to the gas main 70, as shown, and continuously supplies gas to a constantly burning pilot burner 74 as ordinarily used in connection with gas burners. A similar conduit 75 may connect with the outlet 27 leading from plug 15 for conveying gas released through valve 33 to an auxiliary pilot burner indicated at 76.

From the foregoing, it will be understood by those skilled in the art that the valves 32 and 33 form pilot valves for admitting pressure to and releasing pressure from within the cover 5, respectively. I will now describe the complete operation of my improved thermostatic control arrangement. With the parts in the position shown in the drawing, the thermostat is satisfied and the heating element 38 being deenergized the valve 33 is seated. Valve 32 being unseated, gas pressure from the inlet side of the main valve is supplied therethrough to the interior of the cover 5. By reason of the pressure within the cover 5, the diaphragm 8 is held downwardly and the diaphragm valve is seated due to this pressure as well as its own weight. The pressure within cover 5 is at this time holding the diaphragm 51 in an upwardly flexed position. Should now the temperature to which the thermostat 39 is responsive begin to fall, at a predetermined value thereof, the contacts 44 and 46 will be made, and at a slightly lower predetermined temperature the contacts 43 and 45 will be made. As soon as this occurs, the heating element 38 will be energized through an electrical circuit which is as follows: from the secondary 42 of the transformer 40 through a wire 80 to the heating element 38, and from the heating element 38 through a wire 81 and a wire 82 to the contact 45, through the thermostat and contact 46 and wire 83, back to the secondary 42. Upon energization of the heater 38, the bimetal element 30 will flex to the right snapping past its dead-center position thereby unseating the valve 33 and seating the valve 32. This will release the gas from within the cover 5 to the burner 76 and will cut off the supply of gas from the inlet side of the valve to the tube 20. Upon release of pressure from within cover 5, the pressure on the inlet side of the valve acting on the valve disc 9 will break the seal between the valve disc and the seat 4 permitting pressure to act on the lower side of the outer portions of diaphragm 8. As soon as this occurs, the additional lifting force occasioned by the gas acting also on the outer portions of diaphragm 8 will cause it to snap upwardly, opening the valve and permitting gas to flow to the burner 72. Heat will now be supplied to the spaces being served as long as the valve is open.

Simultaneously with the release of pressure from within cover 5, the auxiliary diaphragm 51 will flex downwardly causing the contacts 59 and 60 to be made. Closure of contacts 59 and 60 completes an additional energizing circuit for the heater 38 which is as follows: from the secondary 42 of the transformer through wire 80, the heater 38, wire 81, a wire 85, the contacts 59 and 60, blade 58, a wire 86, through the thermostat, the fixed contact 46, and wire 83 back to the secondary of the transformer. It will now be seen that by reason of this last described circuit, heater 38 will remain energized as long as contacts 44 and 46 are in a closed position. Thus as the temperature rises in the spaces being heated, the contacts 43 and 45 will become broken but the diaphragm valve will remain in open position until the contacts 44 and 46 are broken at a slightly higher temperature. It will thus be seen that by reason of the auxiliary diaphragm actuated contacts 59 and 60, the thermostat has a positive operating differential which, as is well known, is desirable as it avoids the fluttering and uncertain characteristic of a single contact thermostat.

When the temperature rises to a predetermined value at which contacts 44 and 46 break, the heater 38 will become deenergized and bimetal element 30 will snap into the position shown in the drawing, spring 35 assuring the snap whenever element 30 is not heated. When this occurs, pressure will again be admitted to the cover 5 and the parts will assume the positions shown in the drawing, the diaphragm valve becoming seated with a snap action. The diaphragm valve seats with a snap action by reason of the fact that as it approaches its seat, the pressure underneath the outer portions of the diaphragm is reduced causing the pressure above the diaphragm to seat the valve with a snap movement.

From the foregoing, it should be apparent to those skilled in the art that I have provided an extremely simple and inexpensive arrangement of parts for controlling a valve and have afforded unusually advantageous means for establishing a holding circuit through the thermostatic control device. My device employs the pressure of the gas itself for operating the auxiliary contacts in the holding circuit and therefore eliminates the necessity of providing an additional apparatus for producing this function. The gas pressure which is utilized for operating the auxiliary contacts is already available in the cover 5 for actuating the diaphragm valve, and by reason of my improved arrangement only the small auxiliary diaphragm and contacts operated thereby, which may be of very inexpensive nature, are necessary for purposes of establishing the holding circuit. My improved combination and arrangement enable those practicing my invention to gain the improved operating results characteristic of double contact thermostats of the type shown, in the control of gas valves in a very efficient and satisfactory manner.

While only one embodiment of my invention has been disclosed, there are many forms and modifications which it may take and there are many changes in the structure thereof which will occur to those skilled in the art. It is therefore expressly understood that the disclosed embodiment is to be interpreted as illustrative only, the invention to be limited only as determined by the scope of the appended claims.

I claim as my invention:

1. In a control valve assembly, in combination, a diaphragm valve having a pressure chamber, pilot valve mechanism for regulating the pressure in said chamber whereby said valve is controlled, electrical means comprising a thermostat having two contact members for controlling said electrical means, an electrical circuit for energizing said electrical means through both said contact members, and contact means controlled by pressure in said pressure chamber in an electrical circuit for energizing said electrical means through only one contact member of said thermostat.

2. In apparatus of the character described, in combination, a diaphragm valve having a pressure chamber, means for controlling the pressure in said chamber comprising an electric thermostat of the type having a plurality of pairs of contacts which operate sequentially upon a change in temperature, electrical connections for energizing said means when two pairs of said contacts are closed, and means responsive to pressure in said chamber for closing electrical contacts in a circuit energizing said first means, said circuit including only one of said pairs of contacts.

3. In apparatus of the character described, in combination, a valve having a pressure chamber, means for regulating the pressure in said chamber whereby the valve is controlled, said means comprising pilot valve mechanism and electrically energizable actuating means therefor, an electric thermostat having at least two contact blades, a fixed contact associated with each contact blade, said contact blades engaging their respective associated fixed contacts sequentially upon a fall in temperature and disengaging from them sequentially in reverse order upon a rise in temperature, an electrical circuit for energizing said actuating means through two of said contact blades, and an electrical circuit for energizing said actuating means through one of said two contact blades including electrical contacting means responsive to pressure in said chamber actuated upon energization of said aforementioned actuating means.

4. In apparatus of the character described, in combination, a diaphragm valve having a pressure chamber, electrically operated means for controlling the pressure in said chamber comprising a condition responsive switch having two pairs of sequentially engaging contacts, a maintaining switch positioned responsive to the pressure in said chamber, electrical connections independent of said maintaining switch for energizing said means when the last to be engaged of said pairs of contacts is closed, and further electrical connections including said maintaining switch for energizing said means independently of the last to be engaged of said contacts.

5. In a diaphragm gas valve, a valve, a diaphragm connected to said valve, a housing associated with said diaphragm and forming a control chamber therewith, means for admitting gas to said chamber, pilot valve mechanism within said chamber for controlling the gas pressure within said chamber, a slow acting electrically operated motor within said chamber for positioning said pilot valve mechanism, a second diaphragm forming a portion of said housing and positioned in accordance with the gas pressure within said chamber, a maintaining switch exterior to said chamber and positioned by said second diaphragm, a condition responsive switch having two pairs of sequentially engaging contacts, circuit connections for energizing said motor independently of said maintaining switch when both pairs of contacts are closed, and further circuit connections including said maintaining switch for energizing said motor independently of the last to be engaged of said two pairs of contacts.

6. In a diaphragm gas valve, a valve, a diaphragm connected to said valve, a housing associated with said diaphragm and forming a control chamber therewith, means for admitting gas to said chamber, pilot valve mechanism within said chamber for controlling the gas pressure within said chamber, an electrothermal motor within said chamber for positioning said pilot valve mechanism, a second diaphragm forming a portion of said housing and positioned in accordance with the gas pressure within said chamber, a maintaining switch exterior to said chamber and positioned by said second diaphragm, a condition responsive switch having two pairs of sequentially engaging contacts, circuit connections for energizing said electrothermal motor independently of said maintaining switch when both pairs of contacts are closed, and further circuit connections including said maintaining switch for energizing said motor independently of the last to be engaged of said two pairs of contacts.

7. In apparatus of the character described, in combination, a valve having a pressure chamber, means for regulating the pressure in said chamber whereby the valve is controlled, said means comprising electrically energizable pilot valve mechanism, an electric thermostat having at least two contact blades associated therewith, a fixed contact associated with each contact blade, said contact blades engaging their associated fixed contacts sequentially upon a fall in temperature and disengaging from them sequentially in reverse order upon a rise in temperature, an electrical circuit for energizing said mechanism through one of said blades, and an electrical circuit for energizing said mechanism through another of said blades including electrical contacting means responsive to pressure in said chamber actuated upon energization of said mechanism.

ALBERT E. BAAK.